United States Patent [19]

Haraguchi et al.

[11] 4,314,747
[45] Feb. 9, 1982

[54] LIGHT SHIELDING DEVICE FOR AUTOMATIC FOCUS DETECTING

[75] Inventors: Keisuke Haraguchi, Ranzan; Harumi Aoki, Kiyose, both of Japan

[73] Assignee: Asahi Kogaku Kogyo Kabushiki Kaisha, Tokyo, Japan

[21] Appl. No.: 118,700

[22] Filed: Feb. 5, 1980

[30] Foreign Application Priority Data

Feb. 16, 1979 [JP] Japan ............... 54-18642[U]

[51] Int. Cl.³ .................. G03B 3/00; G03B 7/099
[52] U.S. Cl. ................................. 354/25; 354/59
[58] Field of Search .............. 354/23 R, 25, 44, 49, 354/59; 352/140; 355/56

[56] References Cited

U.S. PATENT DOCUMENTS 4,075,640 2/1978 Weda et al. ................. 354/59 X
4,110,765 8/1978 Miyata et al. ..................... 354/59
4,180,312 12/1979 Schmidt et al. ................... 354/59

Primary Examiner—Michael L. Gellner
Attorney, Agent, or Firm—Sughrue, Mion, Zinn, Macpeak & Seas

[57] ABSTRACT

A light-shielding device for a single lens reflex automatic focus camera in which the focus detecting element is normally covered by a shielding plate. The protecting plate is coupled along one edge thereof to a shaft while the end is coupled to one end of an operating lever. The other end of the operating lever is coupled through a U-shaped spring to a mirror operating lever of the camera wherein the U-shaped spring provides a snap action upon release of the shutter curtain which quickly moves the shielding plate to its uncovered position.

6 Claims, 6 Drawing Figures

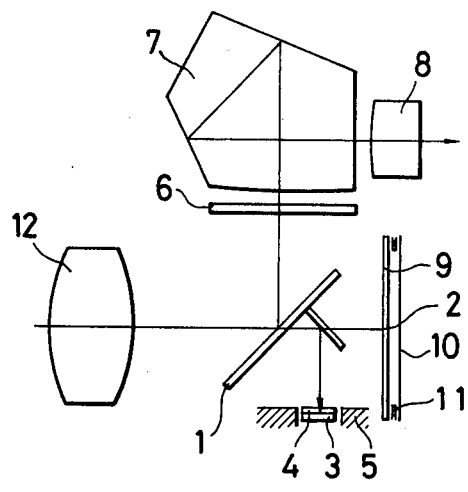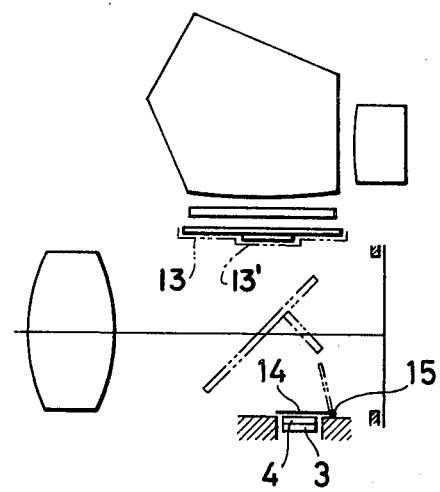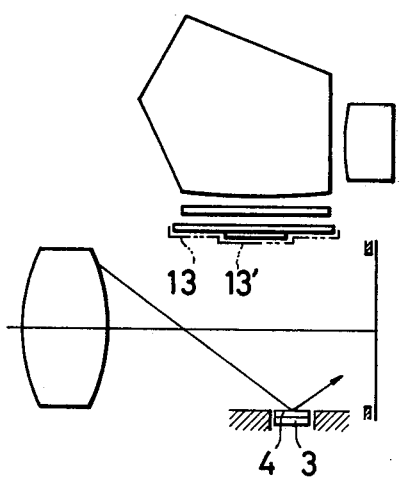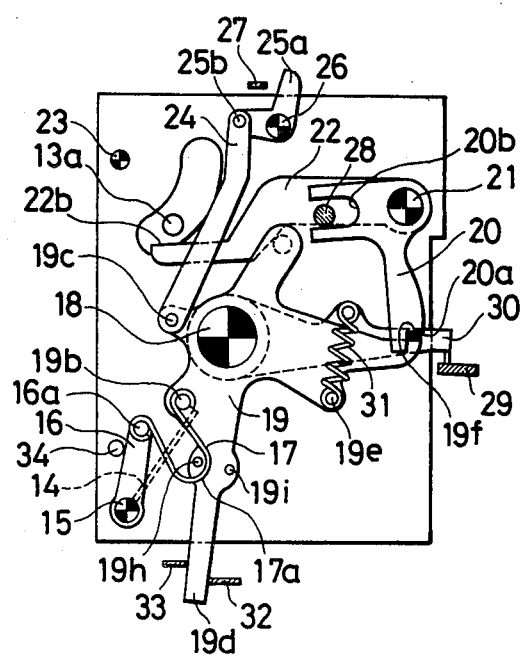

LIGHT SHIELDING DEVICE FOR AUTOMATIC FOCUS DETECTING

BACKGROUND OF THE INVENTION

The present invention relates to a single-lens reflex camera having an automatic focus detecting element such as a self-scanning type photoelectric element hereinafter referred to as "an image sensor" when applicable. More particularly, the invention relates to a light shielding device for an automatic focus detecting device in such a single-lens reflex camera.

First, an example of a focus detecting principle, a so-called "contrast method" will be described. The contrast of light and shade of an optical image of an object which is formed by a lens becomes a maximum when the image is precisely focussed. This is due to the fact that the power spectrum of the object's image becomes a maximum when the lens is focused on the object. A variety of devices for automatically detecting a focal position utilizing this phenomenon have been proposed in the art. In one of automatic focus detecting elements employed in such an automatic focus detecting device utilizing the contrast of an object, an image sensor is used to electrically scan an object's image to thereby obtain a time-series signal. The time-series signal is electrically processed to dynamically detect the contrast information of the object's image. The image sensor is used is most commonly a photoelectric element in which a plurality of microphotoelectric elements and a scanning circuit are built. The image sensor is called "a MOS-FET type image sensor" or "a CCD type image sensor" depending on the type of scanning circuit. These devices are commercially available.

An automatic focus detecting device utilizing the image sensor may be made quite compact because it can be constructed with an electrical circuit and a simple mechanism in which the image sensor is arranged at a position equivalent to the plane of the film.

In applying the automatic focus detecting device using the image sensor to a single-lens reflex camera it is necessary to simultaneously introduce a light beam forming the image of an object to the finder system and the focus detecting system. For this purpose, for instance, a technique has been employed in which the beam is divided into two parts using a half-silvered mirror and a total reflection mirror so that one of the two parts is utilized to form the image of the object on the focusing plate in the finder system while the other is used to for the image of the object on the image sensor in the focus detecting system.

In this connection, it is required that the aforementioned mirrors be disposed away from the optical path of the image thereby to prevent the occurrence of vignette on the film surface and to eliminate the occurrence of ghosts or the like on the film surface which may be cause by unwanted light which is reflected by a required protecting plate, such as a glass plate, of the image sensor in the focus detecting system or by the focusing plate in the finder system.

It is well known in the art to provide a frame holding the mirrors which is lifted to cover the focusing plate to block the light reflected by the focusing plate and to prevent the leakage of light from the finder to the film surface. It is absolutely necessary to eliminate the unwanted light reflected by the protecting plate of the image sensor since it adversely affects the picture.

In view of the foregoing, an object of the invention is to provide a light shielding device for an automatic focus detecting element such as an image sensor in a single-lens reflex camera.

SUMMARY OF THE INVENTION

This, as well as other objects of the invention, are met by a light shielding device for an automatic focus detecting element in an automatic focus detecting device of a single-lens reflect camera including the automatic focus detecting element, means for shielding the automatic focus detecting element from light before the shutter curtain of the camera is opened, and means for releasing the light shielding means after the shutter curtain of the camera is closed.

The shielding means is preferably a shielding plate which covers the automatic focus detecting element in a first position thereof and which is rotatable by a shaft coupled along an edge portion thereof to a position at which the automatic focus detecting element is uncovered. The releasing means preferably includes a lever coupled at one end thereof to the shaft and a spring coupled between a second end of the lever and a mirror operating lever of the camera. The spring is disposed so as to provide a snap action which rotates the shielding plate away from the focus detecting element to its uncovered position at the commencement of the photographing operation. In the preferred embodiment, the spring is U-shaped.

BRIEF DESCRIPTION OF THE DRAWINGS

FIG. 1 is a sectional view of an automatic focus detecting device of the invention.

FIG. 2 is a diagram showing the path of light reflected by a protecting glass.

FIG. 3 is a diagram showing an image sensor 3 shielded from light.

FIGS. 4, 5 and 6 are diagrams for a description of the operation of a mirror operating mechanism and a light shielding device.

DESCRIPTION OF THE PREFERRED EMBODIMENTS

Figure 5:
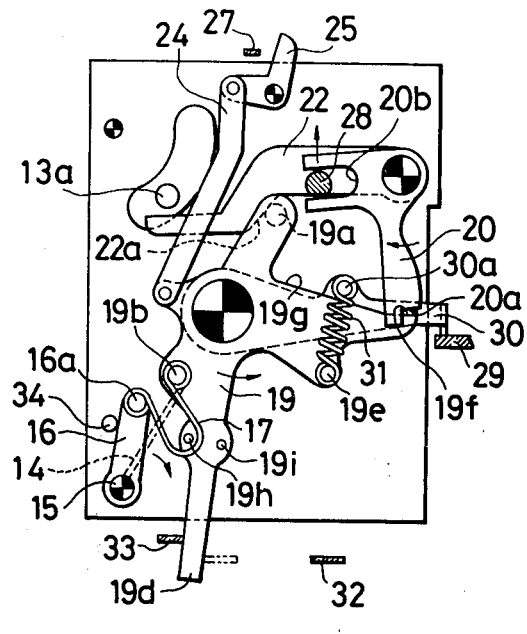
Figure 6:
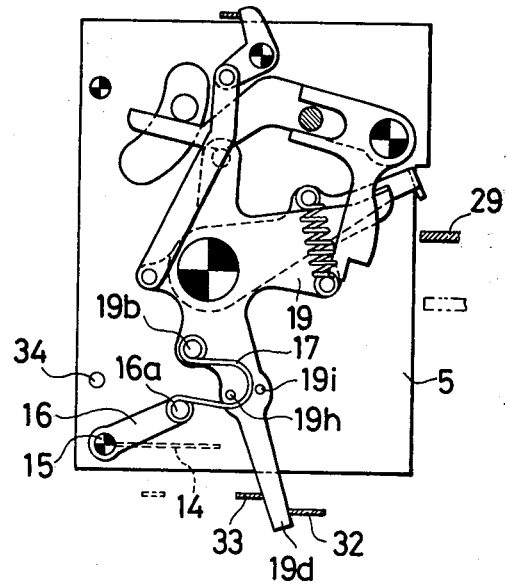

A preferred embodiment of the invention will be described with reference to the accompanying drawings. FIG. 1 is a sectional view showing an automatic focus detecting device in a single-lens reflex camera constructed according to the present invention. FIG. 2 is an explanatory diagram for a description of the reflection paths from the protecting glass 3 of an image sensor 3. FIG. 3 is also an explanatory diagram showing a light shielding device for the image sensor 3 according to the invention. FIGS. 4, 5 and 6 show various operating states of a mirror operating mechanism and the light-shielding device.

In FIG. 1, reference numeral 1 designates a mirror in which the central portion through which the optical axis passes is formed as a half-silvered mirror and the remaining portion is formed as a total reflection mirror. Mirror 1 hereinafter is referred to as "a first mirror". Reference numeral 2 designates a total reflection mirror hereinafter referred to as "a second mirror"; 3 is the aforementioned image sensor; 4, the protective glass of the image sensor 3; 5, a mirror box housing; 6, a focusing plate; 7, a pentaprism; 8, a magnifier (Loupe); 9, a shutter; 10, a film; 11, an aperture; and 12, a lens.

In FIGS. 2 and 3, reference numerals 13 and 13' designate the holding frames of the above-described first and second mirrors 1 and 2, respectively; 14, a light shielding plate for the image sensor 3; and 15, the rotary shaft of the light shielding plate.

In FIGS. 4 through 6, reference numeral 16 designates a coupling lever which is rotatably mounted on the rotary shaft 15, the light shielding plate 14 being turned in association with the lever 16; 17, a coupling spring; 19, a mirror operating lever rotatably mounted on a shaft 18; 20, a locking lever which is rotatably mounted on a shaft 21 and biased counterclockwise by a spring (not shown); 22, a mirror lifting lever rotatably mounted on the shaft 21, 23, the rotary shaft of the holding frame 13 of the first mirror 1; 24, a coupling plate; 25, a shutter operating lever rotatably mounted on a shaft 26; 27, a shutter locking lever; 28, a locking releasing pin; 29, a lens stop lever; and 30, a stop operating lever rotatably mounted on the shaft 18.

Further in FIGS. 4 through 6, reference numeral 31 designates a stop-down lever; 32, a mirror device lever A which is pivotally supported on the lower surface of the mirror box (not shown); 33, a mirror driving lever B which is pivotally supported on the lower surface of the mirror box similar to the mirror driving lever A; and 34, a stop bar. The lever 32 is coupled to the lever 33 by means of a spring corresponding to a mirror lifting spring, and the mirror driving lever 33 is coupled to the mirror box casing by means of a spring corresponding to a mirror lowering spring.

The operation of the automatic focus detecting device thus constructed will be described. When the mirror driving lever 32 set as shown in FIG. 4 is set to the position shown in FIG. 5 in association with the operation of a winding mechanism (not shown), lifting and lowering springs (not shown) coupled to the lever 32 are charged and locked by locking levers (not shown), respectively.

When the locking releasing pin 28 is moved by the operation of a release button (not shown) in FIG. 5, the locking lever 20 turns clockwise because the fork 20b of the locking lever 20 is engaged with the pin 28 and, accordingly, the other end portion 20a of the locking lever 20 disengages from one end portion 19f of the mirror operating lever 19. In this connection, one end portion 19d of the lever 19 abuts against the mirror driving lever 33 and, while the mirror driving lever 32 is charged, the mirror operating lever 19 is energized turning counterclockwise through the mirror driving lever 33 by the lifting spring (not shown). Therefore, when the lever 19 is disengaged from the locking lever 20, the lever 19 turns in the direction of the arrow. As a result, a pin 19a on one end portion of the lever 19 abuts against the sloped surface 22a of the mirror lifting lever 22 causing the latter 22 to turn clockwise while one end portion 22b of the lever 22 lifts the mirror holding frame 13 through a pin 13a mounted to the holding frame 13 and, accordingly, the second mirror 2 is also lifted by the first mirror 1 and an interlocking mechanism (not shown). A sloped surface formed on the other end portion of the lever 19 abuts against a pin 30a on the stop operating lever 30 so as to turn the latter 30 counterclockwise thereby to release the lens stop lever 29 which has been stopped down by the stop down spring 31 connected between the pin 19e and the pin 30a. The coupling spring 17, performing a snap action which is connected between a pin 19b mounted on one end portion of the mirror operating lever 19 and a pin 16a mounted on one end portion of the coupling lever 16, urges the coupling lever 16 to turn counterclockwise so that the coupling lever 16 is maintained in abutment against the stopper 34 in the state shown in FIG. 4 or 5 in which the mirror remains stationary because the movable pin 16 lies obliquely above a line connecting a fulcrum pin 19b and the shaft 15.

When the mirror operating lever 19 is turned counterclockwise, the pin 19b turns counterclockwise and the portion 17a of the coupling spring 17 is turned also counterclockwise by a pin 19h mounted on one end portion 19a of the lever 19. As a result, the movable pin 16a starts turning clockwise around the shaft 15. When the movable pin 16a crosses a line connecting the fulcrum pin 19b and the shaft 15, the interlocking lever 16 is automatically turned clockwise around the shaft 15 by the snap action of the coupling spring 17 and therefore the light shielding plate 14 turning in association with the lever 16 covers the image sensor as shown in FIG. 3. At the end of the counterclockwise movement of the lever 19, the lever 19 turns the lever 25 counterclockwise with the aid of the coupling plate 24 through which the pin 19c mounted on the other end portion of the lever 19 is coupled to a pin 25b mounted on other end portion of the lever 25 and the shutter locking lever 27 is released by one end portion 25a of the shutter release lever 25, as a result of which the shutter 9 starts running.

In FIG. 6, the locking lever (not shown) locking the mirror driving lever 32 is released at the end of the run of the shutter bottom curtain whereupon the mirror operating lever 19 is turned clockwise by mirror driving the lever 32 by the lowering spring (not shown) connected between the mirror box casing 5 and the mirror driving lever 32. Thus, the state shown in FIG. 4 is again attained.

On the other hand, as a pin 19i mounted on end portion of the mirror operating lever 19 and the fulcrum pin 19b turn clockwise, the coupling spring 17 starts turning clockwise and, therefore, the movable pin 16a of the coupling spring 17 is turned counterclockwise around the shaft 15. When the movable pin 16a crosses a line connecting the fulcrum pin 19b and the shaft 15, the coupling lever 16 is turned counterclockwise by the snap action of the coupling spring 17 until it abuts agains the stopper 34. At the same time, the first and second mirrors are simultaneously restored. Therefore, the light shielding plate 14 turning in association with the coupling lever 16 is moved to the position indicated by the dot-chain line in FIG. 3 so that light is applied to the image sensor 3.

As is apparent from the above description, in the automatic focus detecting device according to the invention, in association with the mirror operating mechanism during photographing operation the image sensor 3 is shielded from light by the light shielding plate 4 before the shutter is opened and the light-shielding is released after the shutter is closed so as to eliminate the effects of unwanted light reflected by the protecting plate 4 of the image sensor 3. Thus, the automatic focus detecting device according to the invention has a high reliability and is quite effective in practical use.

What is claimed is:

1. A light shielding device of an automatic focus detecting element in an automatic focus detecting device of a single-lens reflex camera comprising: an automatic focus detecting element positioned in said camera to receive incoming light; means for shielding said automatic focus detecting element from light before the shutter curtain of said camera is opened and so long as it remains opened; and means for releasing said light shielding means after the shutter curtain of said camera is closed.

2. The device of claim 1 wherein said light shielding device further comprises a mirror in which a central portion thereof through which the optical axis passes is a half-silvered mirror and the remaining portion of said mirror is a total reflection mirror; and further comprising a second total reflection mirror and a mirror box, said second reflection mirror and said automatic focus detecting element being provided on the lower portion of said mirror box.

3. The light shielding device as claimed in claim 1 wherein said shielding means comprises: a shielding plate for covering said automatic focus detecting element in a first position thereof; and a rotatable shaft coupled to an edge of said shielding plate, said, shaft upon rotation, rotating said shielding plate to uncover said automatic focus detecting element.

4. The light shielding device of claim 4 wherein said releasing means comprises: a lever coupled at one end to an end of said shaft; and a spring coupled between a second end of said lever and a mirror operating lever of said camera.

5. The light shielding device of claim 4 wherein said spring is disposed to provide a snap action to rotate said shielding plate to the uncovered position.

6. The light shielding device of claim 5 wherein said spring is U-shaped.

* * * * *